(12) United States Patent
Hintzer et al.

(10) Patent No.: US 8,119,750 B2
(45) Date of Patent: Feb. 21, 2012

(54) EXPLOSION TAMING SURFACTANTS FOR THE PRODUCTION OF PERFLUOROPOLYMERS

(75) Inventors: Klaus Hintzer, Kastl (DE); Michael Jürgens, Neuoetting (DE); Harald Kaspar, Burgkirchen (DE); Andreas R. Maurer, Langenneufnach (DE); Werner Schwertfeger, Aitoetting (DE); Tilman C. Zipplies, Burghausen (DE)

(73) Assignee: 3M Innovative Properties Company, Saint Paul, MN (US)

( * ) Notice: Subject to any disclaimer, the term of this patent is extended or adjusted under 35 U.S.C. 154(b) by 1352 days.

(21) Appl. No.: 11/457,236

(22) Filed: Jul. 13, 2006

(65) Prior Publication Data
US 2008/0015319 A1 Jan. 17, 2008

(51) Int. Cl.
C08F 16/24 (2006.01)
(52) U.S. Cl. .......................... 526/247; 526/242; 526/250
(58) Field of Classification Search .................. 526/247, 526/250, 242
See application file for complete search history.

(56) References Cited

U.S. PATENT DOCUMENTS

| | | |
|---|---|---|
| 2,713,593 A | 7/1955 | Brice et al. |
| 3,037,953 A | 6/1962 | Marks et al. |
| 3,142,665 A | 7/1964 | Cardinal et al. |
| 3,179,614 A | 4/1965 | Edwards |
| 3,260,691 A | 7/1966 | Lavin et al. |
| 3,271,341 A | 9/1966 | Garrison |
| 3,315,201 A | 4/1967 | Werme |
| 3,345,317 A | 10/1967 | Hoashi |
| 3,391,099 A | 7/1968 | Punderson |
| 3,451,908 A | 6/1969 | Sianesi et al. |
| 3,489,595 A | 1/1970 | Brown, Jr. |
| 3,555,100 A | 1/1971 | Garth et al. |
| 3,635,926 A | 1/1972 | Gresham et al. |
| 3,642,742 A | 2/1972 | Carlson |
| 3,721,696 A | 3/1973 | Sianesi et al. |
| 3,790,403 A | 2/1974 | Ribbans, III |
| 3,855,191 A | 12/1974 | Doughty, Jr. et al. |
| 3,882,153 A | 5/1975 | Seki et al. |
| 3,981,945 A | 9/1976 | Attwood et al. |
| 4,016,345 A | 4/1977 | Holmes |
| 4,025,709 A | 5/1977 | Blaise et al. |
| 4,049,863 A | 9/1977 | Vassiliou |
| 4,123,401 A | 10/1978 | Berghmans et al. |
| 4,131,711 A | 12/1978 | Attwood |
| 4,252,859 A | 2/1981 | Concannon et al. |
| 4,262,101 A | 4/1981 | Hartwimmer et al. |
| 4,282,162 A | 8/1981 | Kuhls |
| 4,287,112 A | 9/1981 | Berghmans |
| 4,292,402 A | 9/1981 | Pollet et al. |
| 4,342,825 A | 8/1982 | Van Poucke et al. |
| 4,353,950 A | 10/1982 | Vassiliou |
| 4,369,266 A | 1/1983 | Kuhls et al. |
| 4,380,618 A | 4/1983 | Khan et al. |
| 4,381,384 A | 4/1983 | Khan |
| 4,391,940 A | 7/1983 | Kuhls et al. |
| 4,425,448 A | 1/1984 | Concannon et al. |
| 4,439,385 A | 3/1984 | Kuhls et al. |
| 4,544,458 A | 10/1985 | Grot et al. |
| 4,548,986 A | 10/1985 | Suzuki et al. |
| 4,552,925 A | 11/1985 | Nakagawa et al. |
| 4,588,796 A | 5/1986 | Wheland |
| 4,618,641 A | 10/1986 | Hengel |
| 4,621,116 A | 11/1986 | Morgan |
| 4,623,487 A | 11/1986 | Cope |
| 4,766,190 A | 8/1988 | Morita et al. |
| 4,789,717 A | 12/1988 | Giannetti et al. |
| 4,832,879 A | 5/1989 | Hamprecht |
| 4,861,845 A | 8/1989 | Slocum et al. |
| 4,864,006 A | 9/1989 | Giannetti et al. |
| 4,987,254 A | 1/1991 | Schwertfeger et al. |
| 5,075,397 A | 12/1991 | Tonelli et al. |
| 5,153,322 A | 10/1992 | Flynn |
| 5,160,791 A | 11/1992 | Tannenbaum |
| 5,168,107 A | 12/1992 | Tannenbaum |
| 5,182,342 A | 1/1993 | Feiring et al. |
| 5,198,491 A | 3/1993 | Honda et al. |

(Continued)

FOREIGN PATENT DOCUMENTS

CA 2354138 6/2000

(Continued)

OTHER PUBLICATIONS

Apostolo et al., "Microemulsion Polymerization for Producing Fluorinated Structured Materials", Macromol. Symp. 2004, 206, pp. 347-360. England, "Catalytic Conversion of Fluoroalkyl Alkyl Ethers to Carbonyl Compounds", J. Org. Chem., 1984, vol. 49, pp. 4007-4008.
Ivanova et al., "Synthesis of Alcohols from Perfluorvinyl Esters", Zh. Vses. Khim Obsh 1999, (24), pp. 656-657.
Sudol et al., "Miniemulsion Polymerization", Emulsion Polymerization and Emulsion Polymers, John Wiley & Sons, 1997, Chapter. 20.
Candau, "Inverse Emulsion and Microemulsion Polymerization", Emulsion Polymerization and Emulsion Polymers, John Wiley & Sons, 1997, Chapter 21.

(Continued)

Primary Examiner — Peter D. Mulcahy
Assistant Examiner — Henry Hu
(74) Attorney, Agent, or Firm — C. Michael Geise

(57) ABSTRACT

A process comprising polymerizing tetrafluoroethylene in an aqueous emulsion in the presence of a non-telogenic surfactant having an anionic portion with the general formula (I):

$$R_f\text{—O-L-}CO_2\text{—} \qquad (I)$$

wherein $R_f$ is selected from a partially fluorinated alkyl group, a perfluorinated alkyl group, a partially fluorinated alkyl group interrupted by one or more oxygen atoms, and a perfluorinated alkyl group interrupted by one or more oxygen atoms, wherein $R_f$ has from 1 to 10 carbon atoms; and L is an alkylene group having the general formula $(CX_2)_n$ wherein each X is independently selected from $R_f$, fluorine, and hydrogen and n is selected from 1 to 5, with the proviso that the surfactant contains at least one unit selected from a —$CH_2$— unit and a —CHF— unit. Also provided are aqueous dispersions comprising these surfactants and methods of coating substrates with the aqueous dispersions.

15 Claims, No Drawings

U.S. PATENT DOCUMENTS

| | | |
|---|---|---|
| 5,219,910 A | 6/1993 | Stahl et al. |
| 5,223,343 A | 6/1993 | Tannenbaum |
| 5,229,480 A | 7/1993 | Uschold |
| 5,230,961 A | 7/1993 | Tannenbaum |
| 5,272,186 A | 12/1993 | Jones |
| 5,285,002 A | 2/1994 | Grootaert |
| 5,312,935 A | 5/1994 | Mayer et al. |
| 5,442,097 A | 8/1995 | Obermeier et al. |
| 5,447,982 A | 9/1995 | Kamba et al. |
| 5,453,477 A | 9/1995 | Oxenrider et al. |
| 5,463,021 A | 10/1995 | Beyer et al. |
| 5,478,651 A | 12/1995 | Tannenbaum |
| 5,488,142 A | 1/1996 | Fall et al. |
| 5,498,680 A | 3/1996 | Abusleme et al. |
| 5,530,078 A | 6/1996 | Felix et al. |
| 5,532,310 A | 7/1996 | Grenfell et al. |
| 5,562,991 A | 10/1996 | Tannenbaum |
| 5,576,381 A | 11/1996 | Bladel et al. |
| 5,591,877 A | 1/1997 | Obermeier et al. |
| 5,608,022 A | 3/1997 | Nakayama et al. |
| 5,656,201 A | 8/1997 | Visca et al. |
| 5,663,255 A | 9/1997 | Anolick et al. |
| 5,667,846 A | 9/1997 | Thomas |
| 5,688,884 A | 11/1997 | Baker et al. |
| 5,700,859 A | 12/1997 | Ogura et al. |
| 5,710,345 A | 1/1998 | Navarrini et al. |
| 5,721,053 A | 2/1998 | Thomas |
| 5,763,552 A | 6/1998 | Feiring et al. |
| 5,789,083 A | 8/1998 | Thomas |
| 5,789,508 A | 8/1998 | Baker et al. |
| 5,804,650 A | 9/1998 | Tsuda et al. |
| 5,895,799 A | 4/1999 | Wu et al. |
| 5,955,556 A | 9/1999 | McCarthy et al. |
| 5,959,026 A | 9/1999 | Abusleme et al. |
| 5,969,063 A | 10/1999 | Parker et al. |
| 5,990,330 A | 11/1999 | Sulzbach et al. |
| 6,013,795 A | 1/2000 | Manzara et al. |
| 6,025,307 A | 2/2000 | Chittofrati et al. |
| 6,037,399 A | 3/2000 | Wu et al. |
| 6,103,843 A | 8/2000 | Abusleme et al. |
| 6,103,844 A | 8/2000 | Brothers |
| 6,126,849 A | 10/2000 | Yamana et al. |
| 6,136,893 A | 10/2000 | Yamashita et al. |
| 6,153,688 A | 11/2000 | Miura et al. |
| 6,218,464 B1 | 4/2001 | Parker et al. |
| 6,245,923 B1 | 6/2001 | Sulzbach et al. |
| 6,255,384 B1 | 7/2001 | McCarthy et al. |
| 6,255,536 B1 | 7/2001 | Worm et al. |
| 6,267,865 B1 | 7/2001 | Polson et al. |
| 6,365,684 B1 | 4/2002 | McCarthy et al. |
| 6,391,182 B2 | 5/2002 | Smeltzer et al. |
| 6,395,848 B1 | 5/2002 | Morgan et al. |
| 6,410,626 B1 | 6/2002 | Wada et al. |
| 6,429,258 B1 | 8/2002 | Morgan et al. |
| 6,436,244 B1 | 8/2002 | Fuhrer et al. |
| 6,482,979 B1 | 11/2002 | Hintzer et al. |
| 6,512,063 B2 | 1/2003 | Tang |
| 6,518,442 B1 | 2/2003 | Felix et al. |
| 6,576,703 B2 | 6/2003 | Kapeliouchko et al. |
| 6,593,416 B2 | 7/2003 | Grootaert et al. |
| 6,602,968 B1 | 8/2003 | Bekiarian et al. |
| 6,610,788 B1 | 8/2003 | Takakura et al. |
| 6,613,941 B1 | 9/2003 | Felix et al. |
| 6,624,268 B1 | 9/2003 | Maekawa et al. |
| 6,632,508 B1 | 10/2003 | Pellerite et al. |
| 6,642,307 B1 | 11/2003 | Sogabe et al. |
| 6,642,415 B1 | 11/2003 | Fuhrer et al. |
| 6,660,798 B1 | 12/2003 | Marchese et al. |
| 6,693,152 B2 | 2/2004 | Kaspar et al. |
| 6,703,520 B2 | 3/2004 | Hintzer et al. |
| 6,706,193 B1 | 3/2004 | Burkard et al. |
| 6,710,123 B1 | 3/2004 | Amin-Sanayei et al. |
| 6,716,942 B1 * | 4/2004 | Saito et al. ............... 526/242 |
| 6,737,489 B2 | 5/2004 | Linert et al. |
| 6,750,304 B2 | 6/2004 | Kaspar et al. |
| 6,761,964 B2 | 7/2004 | Tannenbaum |
| 6,774,164 B2 | 8/2004 | Lyons et al. |
| 6,794,550 B2 | 9/2004 | Hintzer et al. |
| 6,815,040 B2 | 11/2004 | Pellerite et al. |
| 6,822,059 B2 | 11/2004 | Buckanin et al. |
| 6,825,250 B2 | 11/2004 | Epsch et al. |
| 6,833,403 B1 | 12/2004 | Blädel et al. |
| 6,846,570 B2 | 1/2005 | Leech et al. |
| 6,861,466 B2 * | 3/2005 | Dadalas et al. ............... 524/544 |
| 6,861,490 B2 | 3/2005 | Kaspar et al. |
| 6,869,997 B2 | 3/2005 | Wille et al. |
| 6,878,772 B2 | 4/2005 | Visca et al. |
| 6,956,078 B2 | 10/2005 | Cavanaugh et al. |
| 6,972,094 B2 | 12/2005 | Ichida et al. |
| 7,026,036 B2 | 4/2006 | Leech et al. |
| 7,041,728 B2 * | 5/2006 | Zipplies et al. ............... 524/544 |
| 7,045,571 B2 * | 5/2006 | Tan et al. ............... 524/801 |
| 7,064,170 B2 | 6/2006 | Kaspar et al. |
| 7,074,862 B2 | 7/2006 | Kaspar et al. |
| 7,122,608 B1 | 10/2006 | Brinati et al. |
| 7,125,941 B2 | 10/2006 | Kaulbach et al. |
| 7,126,016 B2 | 10/2006 | Fu et al. |
| 7,141,620 B2 | 11/2006 | Hoshikawa et al. |
| 7,262,246 B2 | 8/2007 | Tan et al. |
| 7,279,522 B2 | 10/2007 | Dadalas et al. |
| 7,300,989 B2 | 11/2007 | Buckanin et al. |
| 7,342,066 B2 | 3/2008 | Dadalas et al. |
| 2002/0091212 A1 | 7/2002 | Abusleme et al. |
| 2002/0198345 A1 | 12/2002 | Grootaert et al. |
| 2003/0032748 A1 | 2/2003 | Hintzer et al. |
| 2003/0125421 A1 | 7/2003 | Bladel et al. |
| 2003/0181572 A1 * | 9/2003 | Tan et al. ............... 524/502 |
| 2004/0010156 A1 | 1/2004 | Kondo et al. |
| 2004/0116742 A1 | 6/2004 | Guerra |
| 2004/0143052 A1 | 7/2004 | Epsch et al. |
| 2004/0242755 A1 | 12/2004 | Araki et al. |
| 2005/0043471 A1 | 2/2005 | Epsch et al. |
| 2005/0070633 A1 | 3/2005 | Epsch et al. |
| 2005/0090613 A1 | 4/2005 | Maruya et al. |
| 2005/0107506 A1 | 5/2005 | Kapeliouchko et al. |
| 2005/0154104 A1 | 7/2005 | Malvasi et al. |
| 2005/0228127 A1 | 10/2005 | Tatemoto et al. |
| 2006/0003168 A1 | 1/2006 | Dadalas et al. |
| 2006/0041051 A1 | 2/2006 | Nakatani et al. |
| 2006/0281946 A1 | 12/2006 | Morita et al. |
| 2007/0015864 A1 | 1/2007 | Hintzer et al. |
| 2007/0025902 A1 | 2/2007 | Hintzer et al. |
| 2007/0082993 A1 | 4/2007 | Amin-Sanayei et al. |
| 2007/0117915 A1 | 5/2007 | Funaki et al. |
| 2007/0135558 A1 | 6/2007 | Tsuda et al. |
| 2007/0149733 A1 | 6/2007 | Otsuka et al. |
| 2007/0155891 A1 | 7/2007 | Tsuda et al. |

FOREIGN PATENT DOCUMENTS

| | | |
|---|---|---|
| DE | 3828063 | 2/1990 |
| DE | 19932771 | 1/2001 |
| DE | 19933696 | 1/2001 |
| DE | 10018853 | 10/2001 |
| EP | 0014431 | 8/1980 |
| EP | 0015481 | 9/1980 |
| EP | 0022257 | 1/1981 |
| EP | 0222945 | 11/1984 |
| EP | 0219065 | 4/1987 |
| EP | 0524585 | 1/1993 |
| EP | 0525660 | 2/1993 |
| EP | 0 612 770 A1 | 8/1994 |
| EP | 0 625 526 A1 | 11/1994 |
| EP | 0632009 | 1/1995 |
| EP | 0 649 863 A1 | 4/1995 |
| EP | 0712882 | 5/1996 |
| EP | 0718364 | 6/1996 |
| EP | 0739960 | 10/1996 |
| EP | 0752432 | 1/1997 |
| EP | 0816397 | 1/1998 |
| EP | 0818506 | 1/1998 |
| EP | 0890592 B1 | 1/1999 |
| EP | 0894541 | 2/1999 |
| EP | 0 964 009 A1 | 12/1999 |
| EP | 0 969 927 A1 | 1/2000 |
| EP | 1059333 | 12/2000 |
| EP | 1059342 | 12/2000 |
| EP | 1 083 441 A2 | 3/2001 |

| | | |
|---|---|---|
| EP | 1160258 | 12/2001 |
| EP | 1323677 | 7/2003 |
| EP | 1 334 996 A3 | 8/2003 |
| EP | 1364972 | 11/2003 |
| EP | 1462461 | 9/2004 |
| EP | 1533325 A1 * | 5/2005 |
| EP | 1 514 848 B1 | 4/2006 |
| GB | 642025 | 8/1950 |
| GB | 821353 | 10/1959 |
| GB | 966814 | 8/1964 |
| GB | 1069364 | 5/1967 |
| GB | 1073392 | 6/1967 |
| GB | 1349764 | 4/1974 |
| JP | 46-11031 | 3/1971 |
| JP | 2000-128934 | 5/2000 |
| JP | 2002-179870 | 6/2002 |
| JP | 2002-308914 | 10/2002 |
| JP | 2002-317003 | 10/2002 |
| JP | 2003-043625 | 2/2003 |
| JP | 2003-119204 | 4/2003 |
| JP | 2003-212919 | 7/2003 |
| JP | 2004-358397 | 12/2004 |
| JP | 2004-359870 | 12/2004 |
| JP | 2005-008775 | 1/2005 |
| JP | 2005-105045 | 4/2005 |
| RU | 2158274 | 10/2000 |
| WO | WO 94/14904 | 7/1994 |
| WO | WO 96/24622 | 8/1996 |
| WO | WO 97/17381 | 5/1997 |
| WO | WO 98/50603 | 11/1998 |
| WO | WO 00/22002 | 4/2000 |
| WO | WO 00/35971 | 6/2000 |
| WO | WO 00/52060 | 9/2000 |
| WO | WO 00/71590 A1 | 11/2000 |
| WO | WO 01/40116 A1 | 6/2001 |
| WO | WO 01/79332 | 10/2001 |
| WO | WO 02/14223 | 2/2002 |
| WO | WO 02/20676 | 3/2002 |
| WO | WO-02/44226 A1 * | 6/2002 |
| WO | WO 02/078862 | 10/2002 |
| WO | WO 02/088203 A2 | 11/2002 |
| WO | WO 02/088206 A2 | 11/2002 |
| WO | WO 02/088207 A1 | 11/2002 |
| WO | WO 02/095121 | 11/2002 |
| WO | WO 03/020836 | 3/2003 |
| WO | WO 03/051988 | 6/2003 |
| WO | WO 03/087176 | 10/2003 |
| WO | WO 03/087179 | 10/2003 |
| WO | WO 2004/031141 | 4/2004 |
| WO | WO 2004/067588 | 8/2004 |
| WO | WO 2005/003075 A1 | 1/2005 |
| WO | WO 2005/042593 | 5/2005 |
| WO | WO 2005/056614 | 6/2005 |
| WO | WO 2005/063827 | 7/2005 |
| WO | WO 2005/065800 | 7/2005 |
| WO | WO 2005/082785 A1 | 9/2005 |
| WO | WO 2005/121290 A1 | 12/2005 |
| WO | WO 2006/011533 | 2/2006 |
| WO | WO 2006/020721 | 2/2006 |
| WO | WO 2006/135543 | 12/2006 |
| WO | WO 2007/120348 | 10/2007 |

OTHER PUBLICATIONS

Chi et al., "A Facile Synthesis of Partly-fluorinated Ethers Using Perfluroporpoxyethylene and Aliphatic Alcohols", Bull. Korean Chem. Soc., 1999, vol. 20, No. 2, pp. 220-222.

Ebnesajjad, "Fluoroplastics, vol. 1, Non-Melt Processible Fluoroplastics", Plastics Design Library, NY, 2000, pp. 285-295.

Ebnesajjad, "Fluoroplastics, vol. 2, Melt Processible Fluoropolymers", Plastics Design Library, NY, 2003, pp. 1-21.

ASTM D 4895-04, "Standard Specification for Polytetrafluoroethylene (PTFE) Resin Produced From Dispersion", pp. 1-14.

"Aqueous Emulsion Polymerization Process for Producing Fluoropolymers", U.S. Appl. No. 11/457,239, filed Jul. 13, 2006.

"Fluorinated Surfactants for Use in Making a Fluoropolymer", Great Britain Application No. GB 200523853.0, Filed Nov. 24, 2005.

"Guide to Protein Purification, Methods in Enzymology," Deutscher, M. vol. 182, 24. 1990. (pp. 309-317).

"High Performance Polymers for Diverse Applications," Modern Fluoropolymers. Edited by John Scheirs. John Wiley & Sons, 1997.

"Hydrogen-Ion Activity to Laminated Materials, Glass," Encyclopedia of Chemical Technology. John Wiley & Sons, vol. 13, $3^{rd}$ Ed. 1981. (p. 687).

"Identification to Lignin," Encyclopedia of Polymer Science and Engineering. John Wiley & Sons, vol. 8. 1987 (p. 347).

"Immobilized Biocatalysts to Isoprene," Ullmann's Encyclopedia of Industrial Chemistry. vol. A14. 1985. (p. 439-459).

"Nonionic Surfactants." Edited by Martin J. Schick. 1967.

"Synthesis of Perfluoroalkyl Vinyl Ether Acids and Derivatives," Perfluoroalkyl Vinyl Ether Acids. Raymond Sullivan, vol. 34, No. 6, Jun. 1969, p. 1841-1844.

Storsberg, Joachim and Ritter, Helmut, "Cyclodextrins in Polymer Synthesis: A 'Green' Route to Fluorinated Polymers via Cyclodextrin Complexes in Aqueous Solution", *Macromol. Chem Phys.*, 2002, pp. 812-818.

DROBNY, Technology of Fluoropolymers, CRC Press LLC, 2001, p. 35.

Kokelenberg, H. and Pollet, R., "A New type fluortensides, based on the addition of nucleophiles to chlorotrifluoroethylene and hexafluoropropylene." Tenside Detergents, 1985, 22(1), pp. 22-27.

W.C. Griffin "Calculation of HLB Values of Non-Ionic Surfactants", Journal of Society of Cosmetic Chemists, vol. 5, (1954) p. 259.

"Basic Physical Properties of Chemical Compounds", Knovel Critical Tables 2008. $2^{nd}$ edition.

* cited by examiner

EXPLOSION TAMING SURFACTANTS FOR THE PRODUCTION OF PERFLUOROPOLYMERS

CROSS-REFERENCE TO RELATED APPLICATIONS

This application claims priority to Great Britain Application No. 0525978.3, filed on Dec. 21, 2005; Great Britain Application No. 0523853.0, filed on Nov. 24, 2005; Great Britain Application No. 0514398.7, filed on Jul. 15, 2005; and Great Britain Application No. 0514387.0 filed on Jul. 15, 2005, all of which are herein incorporated by reference in their entirety.

BACKGROUND

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997. Commonly known or commercially employed fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF) and others. Commercially employed fluoropolymers include fluoroelastomers and thermoplastic fluoropolymers.

Several methods are known to produce fluoropolymers. Such methods include suspension polymerization as disclosed in e.g. U.S. Pat. No. 3,855,191, U.S. Pat. No. 4,439,385 and EP 649863; aqueous emulsion polymerization as disclosed in e.g. U.S. Pat. No. 3,635,926 and U.S. Pat. No. 4,262,101; solution polymerization as disclosed in U.S. Pat. No. 3,642,742, U.S. Pat. No. 4,588,796 and U.S. Pat. No. 5,663,255; polymerization using supercritical $CO_2$ as disclosed in JP 46011031 and EP 964009 and polymerization in the gas phase as disclosed in U.S. Pat. No. 4,861,845.

Currently, the most commonly employed polymerization methods include suspension polymerization and aqueous emulsion polymerization. Aqueous emulsion polymerization normally involves polymerization in the presence of a fluorinated surfactant. The suspension polymerization generally does not involve the use of surfactant but results in substantially larger polymer particles than in case of the aqueous emulsion polymerization. Thus, the polymer particles formed during suspension polymerization settle out of the reaction mixture whereas the dispersions obtained in emulsion polymerization generally exhibit good stability over a long period of time.

An aqueous emulsion polymerization wherein no surfactant is used has been described in U.S. Pat. No. 5,453,477, WO 96/24622 and WO 97/17381 to generally produce homo- and copolymers of chlorotrifluoroethylene (CTFE). For example, WO 97/17381 discloses an aqueous emulsion polymerization in the absence of a surfactant wherein a radical initiator system of a reducing agent and oxidizing agent is used to initiate the polymerization and whereby the initiator system is added in one or more further charges during the polymerization. So-called emulsifier free polymerization has further been disclosed in WO 02/88206 and WO 02/88203. In the latter PCT application, the use of dimethyl ether or methyl tertiary butyl ether is taught to minimize formation of low molecular weight fractions that may be extractable from the fluoropolymer. WO 02/88207 teaches an emulsifier free polymerization using certain chain transfer agents to minimize formation of water-soluble fluorinated compounds. An emulsifier free polymerization is further disclosed in RU 2158274 for making an elastomeric copolymer of hexafluoropropylene and vinylidene fluoride.

Notwithstanding the fact that emulsifier free polymerizations are known, the aqueous emulsion polymerization process in the presence of fluorinated surfactants is still a desirable process to produce fluoropolymers because it can yield stable fluoropolymer particle dispersions in high yield and in a more environmental friendly way than for example polymerizations conducted in an organic solvent. Frequently, the emulsion polymerization process is carried out using a perfluoroalkanoic acid or salt thereof as a surfactant. These surfactants are typically used because they provide a wide variety of desirable properties such as high speed of polymerization, good copolymerization properties of fluorinated olefins with comonomers, small particle sizes of the resulting dispersion, desirable stability, and good polymerization yields, i.e. a high amount of solids can be produced. However, environmental concerns have been raised against these surfactants and moreover these surfactants are generally expensive. In particular, perfluorinated alkanoic acids having 8 or more carbon atoms are known to be bio-accumulating.

Alternative surfactants to the perfluoroalkanoic acids or salts thereof have also been proposed in the art for conducting the emulsion polymerization of fluorinated monomers.

For example, surfactants of the general formula $R_f-C_2H_4-SO_3M$, wherein $R_f$ represents a perfluorinated aliphatic group and wherein M represents a cation, have been disclosed in U.S. Pat. No. 5,789,508, U.S. Pat. No. 4,025,709, U.S. Pat. No. 5,688,884 and U.S. Pat. No. 4,380,618.

U.S. Pat. No. 5,763,552 discloses partially fluorinated surfactants of the general formula $R_f-(CH_2)_m-R'_f-COOM$ wherein $R_f$ represents a perfluoroalkyl group or a perfluoroalkoxy group of 3 to 8 carbon atoms, $R'_f$ represents a perfluoroalkylene of 1 to 4 carbon atoms and m is 1-3.

U.S. Pat. No. 4,621,116 discloses perfluoroalkoxy benzene sulfonic acids and salts thereof in the aqueous emulsion polymerization of fluorinated monomers.

U.S. Pat. No. 3,271,341 teaches perfluoropolyethers of the general formula:

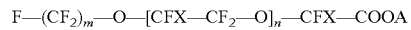

wherein m is 1 to 5, X is F or $CF_3$, A is a monovalent cation and n is 0 to 10. The perfluoropolyethers are taught as emulsifiers in the emulsion polymerization of ethylenically unsaturated monomers.

US 2005/0090613 discloses fluorinated polyethers of the formula:

wherein m is 3 to 10, X is F or a perfluoroalkyl group, n is 0, 1 or 2 and A is the counter ion of the carboxylic anion. These polyethers are taught as emulsifiers in the emulsion polymerization of fluorinated olefins.

The use of perfluoropolyethers having neutral end groups in an aqueous emulsion polymerization is disclosed in U.S. Pat. No. 4,864,006, U.S. Pat. No. 4,789,717 and EP 625526. For example U.S. Pat. No. 4,864,006 and EP 625526 disclose the use of microemulsion prepared from perfluoropolyethers having neutral end groups in an aqueous emulsion polymerization of fluorinated monomers. In a particular embodiment, a certain perfluoropolyether having carboxylic end groups is taught to emulsify the neutral perfluoropolyether.

EP 1,334,996 discloses certain perfluoropolyethers having carboxylic acid groups or salts thereof at both end groups, i.e. the perfluoropolyethers are bifunctional. The perfluoropolyethers are taught for use in aqueous dispersions of fluoropolymers and in the preparation of such dispersion by aqueous emulsion polymerization.

WO 00/71590 teaches the use of a combination of perfluoropolyether surfactants having a carboxylic acid group or salt thereof with a fluoroalkyl carboxylic acid or sulfonic acid or salt thereof. It is taught that the perfluoropolyether surfactants on their own are not very powerful surfactants.

Still further fluorinated ether surfactants for emulsion polymerization have been described in WO 05/03075.

In WO 05/121290, JP 73-03278, U.S. Pat. No. 3,882,153 oligomers from VDF are disclosed for emulsion polymerization.

SUMMARY

In one aspect, the present invention relates to a process comprising polymerizing tetrafluoroethylene in an aqueous emulsion in the presence of a non-telogenic surfactant having an anionic portion with the general formula (I):

$$R_f\text{—O-L-CO}_2\text{—} \tag{I}$$

wherein $R_f$ is selected from a partially fluorinated alkyl group, a perfluorinated alkyl group, a partially fluorinated alkyl group interrupted by one or more oxygen atoms, and a perfluorinated alkyl group interrupted by one or more oxygen atoms, wherein $R_f$ has from 1 to 10 carbon atoms; and L is an alkylene group having the general formula $(CX_2)_n$ wherein each X is independently selected from $R_f$, fluorine, and hydrogen and n is selected from 1 to 5, with the proviso that the surfactant contains at least one unit selected from a —$CH_2$— unit and a —CHF— unit.

In another aspect, the present invention relates to an aqueous dispersion of a tetrafluoroethylene-containing perfluoropolymer comprising a non-telogenic surfactant having an anionic portion with the general formula:

$$R_f\text{—O-L-CO}_2\text{—}$$

wherein $R_f$ is selected from a partially fluorinated alkyl group, a perfluorinated alkyl group, a partially fluorinated alkyl group interrupted by one or more oxygen atoms, and a perfluorinated alkyl group interrupted by one or more oxygen atoms, wherein $R_f$ has from 1 to 10 carbon atoms; and L is an alkylene group having the general formula $(CX_2)_n$ wherein each X is independently selected from $R_f$, fluorine, and hydrogen and n is selected from 1 to 5, with the proviso that the surfactant contains at least one unit selected from a —$CH_2$— unit and a —CHF— unit.

In another aspect, the invention relates to processes to prevent or at least reduce explosions in the production of polytetrafluoroethylene and other perfluoropolymers.

In the present application, when the term is used "interrupted with one or more oxygen atoms", it is meant that one or more ether groups may be present in the aliphatic group. That is, for instance, where two oxygen atoms are present, they are separated by at least one carbon atom, so as to form a di-ether. Peroxide structures are not contemplated by the term "interrupted by one or more oxygen atoms".

DETAILED DESCRIPTION

The present inventors recognize the desirability of finding an alternative emulsion polymerization process in which the use of perfluoroalkanoic acids and salts thereof as a fluorinated surfactant can be avoided or at least greatly reduced. In particular, it would be desirable to find an alternative surfactant or dispersant, in particular one that for example has a low toxicity and/or shows no or only little bioaccumulation. It would also be desirable that the alternative surfactant has good chemical and thermal stability enabling polymerization over a wide range of conditions of for example temperature and/or pressure.

In some embodiments, the alternative surfactant or dispersant allows for a high polymerization rate, good dispersion stability, good yields, good copolymerization properties and/or the possibility of obtaining a wide variety of particle sizes including small particle sizes. The properties of the resulting fluoropolymer should generally not be negatively influenced and preferably would be improved.

In other embodiments, the resulting dispersions, concentrated dispersions, and fluoropolymers obtainable from dispersions as described herein, have good or excellent properties in coating applications and/or impregnation of substrates, including for example good film forming properties.

It would further be desirable that the polymerization can be carried out in a convenient and cost effective way, preferably using equipment commonly used in the aqueous emulsion polymerization of fluorinated monomers. Additionally, it may be desirable to recover the alternative surfactant or dispersant from wastewater streams and/or to remove or recover the surfactant from the dispersion subsequent to the polymerization. Desirably, such recovery can proceed in an easy, convenient and cost effective way. Recovery processes have been reviewed in EP 1514848 and a particular method involves treating the aqueous liquid with adsorbent particles including for example an anion exchange resin as disclosed in EP 1083441, EP 1084097 or other adsorbent particles such as activated carbon particles as disclosed in WO 2005/082785. The processes are typically practiced for recovering perfluorooctanoic acid or salts thereof, which is the most widely used surfactant in making fluoropolymers through aqueous emulsion polymerization. These processes can be adapted to recover the surfactants described herein, having an anionic portion with general formula (I).

The present invention provides a process comprising polymerizing tetrafluoroethylene in an aqueous emulsion in the presence of a non-telogenic surfactant having an anionic portion with the general formula (I):

$$R_f\text{—O-L-CO}_2\text{—} \tag{I}$$

wherein $R_f$ is selected from a partially fluorinated alkyl group, a perfluorinated alkyl group, a partially fluorinated alkyl group interrupted by one or more oxygen atoms, and a perfluorinated alkyl group interrupted by one or more oxygen atoms, wherein $R_f$ has from 1 to 10 carbon atoms; and L is an alkylene group having the general formula $(CX_2)_n$ wherein each X is independently selected from $R_f$, fluorine, and hydrogen and n is selected from 1 to 5, with the proviso that the surfactant contains at least one unit selected from a —$CH_2$— unit and a —CHF— unit. The invention pertains to a safe technology for the production of perfluoropolymers (e.g. PTFE) through aqueous emulsion polymerization of TFE, whereby a significant cause of explosion is avoided.

Without wishing to be bound by theory and without admitting that such is the case, it is believed that the following explanation for the surprising discovery can be made:

TFE is thermodynamically unstable, and decomposes with great reaction enthalpy into carbon and tetrafluoromethane. Under adiabatic and isochoric conditions, the initial pressure increases by 8- to 10-fold during the decomposition.

The decomposition, however, requires an ignition temperature of about 300° C. The invention is based on the knowledge that the explosions start from so-called "hot spots". The "hot spots" form from small amounts of floating fluoropolymer dispersion coagulate. The tetrafluoroethylene polymer coagulate floats on the aqueous surface of the polymerization media, despite having a density of more than 2 g/cm³. Under these conditions, the coagulate is exposed to an elevated TFE concentration in the gas phase, which causes the polymerization speed to accelerate at the polymer-monomer interface. Concurrently, the cooling at the surface is decreased due to the lack of heat transfer fluid (water). These effects combined lead to a heating of the coagulate above the ignition temperature of TFE, which is approximately 300° C. In conjunction with the heating, lumps can form in which for example the PTFE is not only melted, but is also black in color (carbonized). Melted PTFE and carbonized PTFE have been found in polymerization product following explosions. Temperatures above approximately 450° C. are required for carbonization of PTFE.

One attribute of TFE polymerization is that the polymer chain radicals cannot terminate themselves because there is no chain transfer of the polymer in which a fluorine atom separates in order to form a terminal double bond. Consequently, the heat-generating radicals are fixed in place within the coagulate surfaces.

It has been found that in other processes in which the fluorinated radicals can terminate by means of a radical transfer reaction, "hot spots" do not occur, nor have explosions been observed. As a result, in accordance with the processes described herein, an emulsifier is added to the aqueous phase of the polymerization kettle which is capable of sufficiently quickly carrying away the locus of polymerization from floating coagulate via radical transfer. As a result, the ignition temperature is not reached in the floating coagulate.

The non-telogenic surfactants having the anionic portion with general formula (I), described above, do not show significant telogenic activities under standard polymerization conditions for making PTFE. By standard polymerization conditions is meant at a temperature range of from 0 to 150, for instance from about 10 to 100° C., and at a partial pressure of tetrafluoroethylene of from 2 to 40 bar, for instance, from 5 to 30 bar. Only at very high temperatures, for instance, beyond 300° C., does the non-telogenic surfactant act as chain transfer agent. The concentration for the surfactants is typically from 0.005 to 1% by weight based on the amount of fluoropolymer solids in the aqueous dispersion.

Because the aqueous emulsion polymerization described herein can be carried out without the need for using a perfluoroalkanoic acid, dispersions can be readily obtained that are free of perfluoroalkanoic acids or salts thereof. Thus, in some embodiments, the present invention provides aqueous dispersions of a fluoropolymer comprising a surfactant of formula (I) as the only emulsifier in the composition.

The resulting dispersions can be used in a variety of applications including coating and impregnation of substrates. Generally, a non-ionic surfactant should be added to the dispersion for such applications. Accordingly, the invention in a further aspect relates to aqueous dispersions of a fluoropolymer comprising a surfactant of formula (I) as an emulsifier and additionally comprising a non-ionic surfactant. The non-ionic surfactant is typically present in an amount of from 1 to 12% by weight based on the weight of fluoropolymer solids.

The aqueous emulsion polymerization of fluorinated monomers, including gaseous fluorinated monomers, can be conducted using one or more surfactants according to formula (I) as an emulsifier. In one particular embodiment, the polymerization may be carried out using a mixture of surfactants of formula (I).

Particular examples of linking groups L may be selected from the following:
—(CF$_2$)$_g$— wherein g is 1, 2, 3, 4, 5 or 6;
—CFH—(CF$_2$)$_h$— wherein h is 0, 1, 2, 3, 4 or 5;
—CF$_2$—CFH—(CF$_2$)$_d$— wherein d is 0, 1, 2, 3 or 4;
—CH$_2$—(CF$_2$)$_h$— wherein h is 1, 2, 3 or 4;
—(CH$_2$)$_c$— wherein c is 1.

Examples of surfactants according to formula (I) are those having anionic portions of the following formulae:

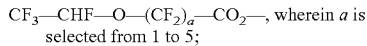, wherein a is selected from 1 to 5;

R$_f'$—O—CHF—CO$_2$—, wherein R$_f'$ is selected from a perfluorinated alkyl group having from 1 to 10 carbon atoms and a perfluorinated alkyl group interrupted by one or more oxygen atoms and having from 1 to 10 carbon atoms;

R$_f'$—O—CHF—CF$_2$—CO$_2$—, wherein R$_f'$ is selected from a perfluorinated alkyl group having from 1 to 10 carbon atoms and a perfluorinated alkyl group interrupted by one or more oxygen atoms and having from 1 to 10 carbon atoms;

R$_f'$—O—CF$_2$—CHF—CO$_2$—, wherein R$_f'$ is selected from a perfluorinated alkyl group having from 1 to 10 carbon atoms and a perfluorinated alkyl group interrupted by one or more oxygen atoms and having from 1 to 10 carbon atoms;

R$_f'$—O—CF$_2$CHFCF$_2$CO$_2$— wherein R$_f'$ is selected from a perfluorinated alkyl group having from 1 to 10 carbon atoms and a perfluorinated alkyl group interrupted by one or more oxygen atoms and having from 1 to 10 carbon atoms;

and combinations thereof.

Specific examples of the surfactants described herein include:

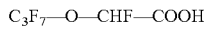

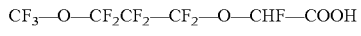

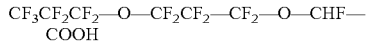

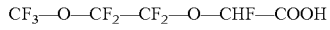

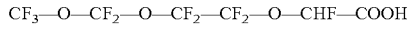

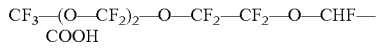

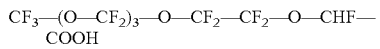

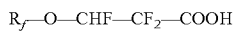

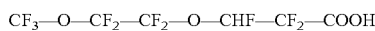

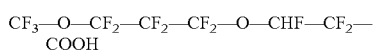

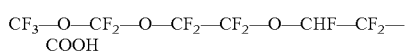

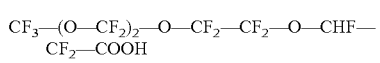

$CF_3-(O-CF_2)_3-O-CF_2-CF_2-O-CHF-CF_2-COOH$ $R_f-O-CF_2-CHFCOOH$ $CF_3-O-CF_2-CHF-COOH$ $C_3F_7-O-CF_2-CHF-COOH$ $CF_3-O-CF_2-CF_2-CF_2-O-CF_2-CHF-COOH$ $CF_3-O-CF_2-O-CF_2-CF_2-O-CF_2-CHF-COOH$ $CF_3-(O-CF_2)_2-O-CF_2-CF_2-O-CF_2-CHF-COOH$ $CF_3-(O-CF_2)_3-O-CF_2-CF_2-O-CF_2-CHF-COOH$ $R_f-O-CF_2-CHF-CF_2COOH$ $CF_3-O-CF_2-CHF-CF_2-COOH$ $C_2F_5-O-CF_2-CHF-CF_2-COOH$ $C_3F_7-O-CF_2-CHF-CF_2-COOH$ $CF_3-O-CF_2-CF_2-CF_2-O-CF_2-CHF-CF_2-COOH$ $CF_3-O-CF_2-O-CF_2-CF_2-O-CF_2-CHF-CF_2-COOH$ $CF_3-(O-CF_2)_2-O-CF_2-CF_2-O-CF_2-CHF-CF_2-COOH$ $CF_3-(O-CF_2)_3-O-CF_2-CF_2-O-CF_2-CHF-CF_2-COOH$ $R_f-(O)_m-CHF-CF_2-O-CH_2-COOH$  $m=0$ or $1$ $CF_3-O-CHF-CF_2-O-CH_2-COOH$ $CF_3-O-CF_2-CF_2-CF_2-O-CHF-CF_2-O-CH_2-COOH$ $C_3F_7-O-CHF-CF_2-O-CH_2-COOH$ $C_3F_7-O-CF_2-CF_2-O-CHF-CF_2-OCH_2COOH$ $C_3F_7-O-CF_2-CF_2-CF_2-O-CHF-CF_2-OCH_2COOH$ $C_3F_7-O-CF_2-CHF-CF_2-OCH_2COOH$ $CF_3-CHF-CF_2-O-CH_2COOH$ $C_3F_7-CF_2-CHF-CF_2-OCH_2-COOH$ $R_f-O-((CF_2)_n-O)_m-CH_2-COOH$  $n=1, 2,$ or $3; m=0, 1, 2$ $CF_3-O-CF_2-CF_2-O-CH_2-COOH$ $CF_3-O-CF_2-CF_2-CF_2-O-CF_2-CF_2-O-CH_2-COOH$ $C_3F_7-O-CF_2-CF_2-O-CH_2-COOH$ $C_3F_7-O-CF_2-CF_2-O-CF_2-CF_2-OCH_2COOH$ $C_3F_7-O-CF_2-CF_2-CF_2-O-CF_2-CF_2-OCH_2COOH$ $C_3F_7-O-CF_2-CF_2-CF_2-OCH_2COOH$ $C_4F_9-O-CH_2-COOH$ $C_3F_7-O-CH_2COOH$ $C_6F_{13}-OCH_2-COOH$ $CF_3CHF-O-(CF_2)_o-COOH$ with $o$ being an integer of 1, 2, 3, 4, 5 or 6

$CF_3CFH-O-(CF_2)_3-COOH$ $CF_3CFH-O-(CF_2)_5-COOH$

In accordance with the present invention, the surfactant is used in the aqueous emulsion polymerization of tetrafluoroethylene, either as a homopolymer to give polytetrafluoroethylene, as a copolymer with perfluorovinyl ethers (PFA, MFA), or as a copolymer with hexafluoropropylene (FEP). Polymerizing tetrafluoroethylene yields a polytetrafluoroethylene (PTFE) that is high in molecular weight and correspondingly has an SSG density (ASTM D 4895-04) of less than 2.25 g/cm$^3$ (inclusive) and is non melt-processable.

As used herein, the term "non-telogenic surfactant" refers to a surfactant in the presence of which it is possible to obtain a non-melt processable PTFE having an SSG density (ASTM D 4895-04) of less than 2.25 g/cm$^3$ (inclusive). In some embodiments a PTFE can be prepared with an SSG density of less than 2.20, even less than 2.19, 2.17, or even lower. In other words, the surfactants described herein allow for the preparation of PTFE having an SSG density comparable to those PTFE's prepared in the presence of perfluorooctanoic acid.

Other copolymers of tetrafluoroethylene are also contemplated by the present invention. These copolymers may include, in addition to tetrafluoroethylene, one or more fluorinated monomers, in particular gaseous fluorinated monomers. By gaseous fluorinated monomers is meant monomers that are present as a gas under the polymerization conditions.

In a particular embodiment, the polymerization of the tetrafluoroethylene, optionally in the presence of one or more additional fluorinated monomers is initiated in the presence of the surfactant of formula (I), for instance, in an aqueous emulsion polymerization. The amount of surfactant of formula (I) may vary depending on the desired properties of the resulting aqueous dispersion, such as the amount of solids, the fluoropolymer particle size, and the like. Generally, the amount of surfactant of formula (I) will be from 0.005% by weight based on the weight of fluoropolymer solids in the aqueous emulsion to 1% by weight; for example, from 0.01% by weight and 0.75% by weight. Some embodiments have a range of from 0.1% by weight to 0.5% by weight.

The anionic portion of the partially fluorintated carboxylic acid used in the process of the invention corresponds to formula (I). Generally, the fluorinated carboxylic acid anion will be a low molecular weight compound, for example a compound having a molecular weight of not more than 1000 g/mol, typically not more than 600 g/mol and in particular embodiments, the fluorinated carboxylic acid anion may have a molecular weight of not more than 500 g/mol.

While the polymerization may be initiated in the presence of the surfactant of formula (I), it is also contemplated that the surfactant of formula (I) is added during the polymerization.

It may, for instance, be desirable to add certain monomers to the polymerization in the form of an aqueous emulsion. For example, fluorinated monomers and in particular perfluorinated co-monomers that are liquid under the polymerization conditions may be added to the polymerization in the form of an aqueous emulsion of the monomer. Such emulsions may be prepared using the surfactant of formula (I) or by using a different surfactant. The emulsions of monomer prepared and added to the polymerization may be in the form of a microemulsion.

The aqueous emulsion polymerization may be carried out at a temperature of from 0 to 150° C. For instance, the temperature may be from 10° C. and higher, from 20° C. and higher, even from 30° C. and higher. The temperature may be up to 100° C., up to 90° C., even up to 80° C. The partial pressure of tetrafluoroethylene in the headspace of the reactor is typically from 5 to 30 bar, in particular, from 5 to 20 bar. The reaction temperature may be varied during the polymerization to influence the molecular weight distribution, e.g., to obtain a narrow or broad molecular weight distribution or to obtain a bimodal or multimodal molecular weight distribution.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinoyl peroxide, dipropionylperoxide, dibutyrylperoxide, diglutaric acid peroxide, and further per-acids and salts thereof such as e.g. ammonium, sodium or potassium salts. Examples of per-acids include peracetic acid. Esters of the peracid can be used as well. Examples of inorganic initiators include for example ammonium-alkali- or earth alkali salts of persulfates, permanganic or manganic acid or manganic acids.

A persulfate initiator, e.g. ammonium persulfate (APS), may be used alone or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit®, available from BASF, Germany) or fluoroalkyl sulfinates. The reducing agent typically reduces the half-life time of the persulfate initiator. Additionally, a metal salt catalyst such as for example copper, iron or silver salts may be added.

The amount of initiator may be from 0.0001% by weight (based on the fluoropolymer solids to be produced) to 1% by weight. In one embodiment, the amount of initiator is from 0.0005 to 0.5% by weight. In another embodiment, the amount may be from 0.005 to 0.3% by weight.

The aqueous emulsion polymerization system may further comprise other materials, such as buffers and, if desired, complex-formers or chain-transfer agents. When present, chain transfer agents are typically present in small amounts so as to not interfere with the preparation of high molecular weight polymers. Examples of chain transfer agents that can be used include ethers, such as dimethyl ether, and methyl t-butyl ether; alkanes having 1 to 5 carbon atoms such as ethane, propane and n-pentane; halogenated hydrocarbons such as $CCl_4$, $CHCl_3$ and $CH_2Cl_2$ and hydrofluorocarbon compounds; and alcohols.

Other compounds that may be present during the polymerization, which may or may not act as a chain transfer agent, include organic, saturated, hydrogen-containing fluorinated compounds that have a water solubility at 25° C. of from $1\times10^{-3}$ (mol/l*bar) to $4\times10^{-3}$ (mol/l*bar). Such compounds may be useful in suppressing explosions by providing supplemental quenching of "hot spots". Such fluorinated compounds are typically present at a partial pressure of from 2.5 mbar to 0.5 bar. These compounds may, in some embodiments, be partially fluorinated hydrocarbons that contain chlorine or ether bridges. In other embodiments, the fluorinated compounds contain at least one —$CH_2$— group or at least one —$CH_3$ group. In yet further embodiments, the fluorinated compounds are selected from 1,1,1-trifluoroethane, 1,1,2-trifluoroethane, 1,1,1,2-tetrafluoroethane, and combinations thereof.

Although the present invention is best suited for the TFE-homopolymerization, and in particular for making high molecular weight PTFE as well as modified PTFE, it is also applicable to other perfluorinated copolymers as described herein.

Examples of fluorinated monomers that may be polymerized using the surfactant of formula (I) as an emulsifier include fully fluorinated gaseous monomers including fluorinated olefins such as tetrafluoroethylene, chlorotrifluoroethylene, hexafluoropropylene, fully fluorinated allyl ethers and fully fluorinated vinyl ethers.

Further examples of fluorinated monomers that may be used in the aqueous emulsion polymerization according to the invention include those corresponding to the formula:

$$CF_2=CF-O-R_f \qquad (II)$$

wherein $R_f$ in formula (II) represents a perfluorinated aliphatic group that may contain one or more oxygen atoms. Preferably, the perfluorovinyl ethers of formula (II) correspond to the general formula:

$$CF_2=CFO(R_fO)_n(R'_fO)_mR''_f \qquad (III)$$

wherein $R_f$ and $R'_f$ in formula (III) are different linear or branched perfluoroalkylene groups of from 2 to 6 carbon atoms, m and n are each independently from 0 to 10, and $R''_f$ is a perfluoroalkyl group of from 1 to 6 carbon atoms. Examples of perfluorovinyl ethers according to the above formulas (II) and (III) include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoroethylvinyl ether (PEVE), perfluoropropylvinyl ether (PPVE), perfluoro-n-propylvinyl ether (PPVE-1) and $CF_3$—$(CF_2)_2$—O—$CF(CF_3)$—$CF_2$—O—$CF(CF_3)$—$CF_2$—O—$CF=CF_2$.

The aqueous emulsion polymerization may be used to produce a variety of fluoropolymers including perfluoropolymers. Also the aqueous emulsion polymerization may result in melt-processable fluoropolymers as well as those that are not melt-processable. Obtainable polymers include, for example, polytetrafluoroethylene and so-called modified polytetrafluoroethylene.

The aqueous emulsion polymerization results in a dispersion of the fluoropolymer in water. Generally, the amount of solids of the fluoropolymer in the dispersion directly resulting from the polymerization will vary from 3% by weight to 40% by weight, depending on the polymerization conditions. A typical range is from 5 to 35%, for instance, from 10 to 30% by weight.

The particle size (volume average particle size) of the fluoropolymer may be from 50 nm to 350 nm, with a typical particle size being from 100 nm to 300 nm.

The amount of surfactant having an anionic portion with the general formula (I) in the resulting dispersion is typically from 0.005 to 1% by weight based on the weight of fluoropolymer solids in the aqueous dispersion. A typical amount may be from 0.01 to 0.75% by weight or from 0.1 to 0.5% by weight, based on the weight of the fluoropolymer solids.

The fluoropolymer may be isolated from the dispersion by coagulation if a polymer in solid form is desired. Also, depending on the requirements of the application in which the fluoropolymer is to be used, the fluoropolymer may be post-fluorinated so as to convert any thermally unstable end groups into stable $CF_3$ end groups. Generally, when the fluoropolymer is post fluorinated, it is post fluorinated such that the amount of end groups in the fluoropolymer other than $CF_3$ is less than 80 per million carbon atoms.

For coating applications, an aqueous dispersion of the fluoropolymer may be desired and hence the fluoropolymer may not need to be separated or coagulated from the dispersion. To obtain a fluoropolymer dispersion for use in coating applications such as, for example, in the impregnation of fabrics or in the coating of metal substrates to make for example cookware, further stabilizing surfactants may be added and/or the level of fluoropolymer solids may be increased. For example, non-ionic stabilizing surfactants may be added to the fluoropolymer dispersion. Typically these will be added to an aqueous fluoropolymer dispersion in an amount of 1 to 12% by weight based on fluoropolymer solids. Examples of non-ionic surfactants that may be added include

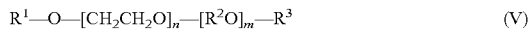

$$R^1-O-[CH_2CH_2O]_n-[R^2O]_m-R^3 \quad (V)$$

wherein $R^1$ represents an aromatic or aliphatic hydrocarbon group (linear or branched) having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2. It will be understood that in the above formula (V), the units indexed by n and m may appear as blocks or they may be present in an alternating or random configuration. Examples of non-ionic surfactants according to formula (V) above include alkylphenol ethoxylates such as ethoxylated p-isooctylphenol commercially available under the brand name TRITON™ such as for example TRITON™ X100 wherein the number of ethoxy units is about 10 or TRITON™ X114 (available from Dow Chemical, Midland, Mich.) wherein the number of ethoxy units is about 7 to 8. Still further examples include those in which $R^1$ in the above formula (V) represents an alkyl group of 4 to 20 carbon atoms, m is 0 and $R^3$ is hydrogen. An example thereof includes isotridecanol ethoxylated with about 8 ethoxy groups and which is commercially available as GENAPOL®X080 (available from Clariant GmbH, Germany). Non-ionic surfactants according to formula (V) in which the hydrophilic part comprises a block-copolymer of ethoxy groups and propoxy groups may be used as well. Such non-ionic surfactants are commercially available from Clariant GmbH under the trade designation GENAPOL®PF 40 and GENAPOL®PF 80.

The amount of fluoropolymer solids in the dispersion may be up-concentrated as needed or desired to an amount between 30 and 70% by weight. Any of the known up-concentration techniques may be used including ultra-filtration and thermal up-concentration.

In some embodiments the surfactant may be removed or reduced from fluoropolymer dispersions described herein. The methods for removal include those generally known in the art including those described in U.S. Pat. No. 6,833,403, Blädel, et al.

Applications for the fluoropolymers and fluoropolymer dispersions made from the processes described herein include those commonly known for fluoropolymers. These applications include, for instance, those described in "Fluoroplastics: Vol. 1, Non-Melt Processible Fluoroplastics", Ebnesajjad, Chapter 17 (2000).

The inventors have also found that the reduced risk of explosion associated with polymerization processes carried out as described herein allows for polymerization on a commercial scale to be carried out in larger reactors and at higher solids content than is safely achieved under previously employed polymerization processes.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Particle Size

The latex particle size determination was conducted by means of dynamic light scattering with a Malvern Zetasizer 1000 HAS in accordance to ISO/DIS 13321. Prior to the measurements, the polymer latexes as yielded from the polymerizations were diluted with 0.001 mol/L KCl-solution, the measurement temperature was 25° C. in all cases. The reported average is the Z-average particle diameter.

SSG: Standard specific gravity was measured according ASTM 4895-04

Solid Content: Determination of solid content was done by subjecting the latex sample to a temperature up to 250° C. for 30 min.

Polymerization of Fluorinated Monomers (Fluoroolefin) Using a Fluorinated Carboxylic Acid The polymerization experiments were performed in a 40 l kettle equipped with an impeller agitator and a baffle. The kettle was charged with 30 l of deionized water and set to 35° C.; the kettle was evacuated repeatedly to remove oxygen; Agitation speed was set to 165 rpm. The oxygen free kettle was charged with 70 mmol fluorinated emulsifier (unless specified differently) as listed in table 3 and the following materials were added: 0.5 ml of a solution containing 40 mg of copper sulfate penta hydrate and 1 mg of conc. sulfuric acid; 15 g of a 25 w-% of aqueous ammonia solution and 5.6 g of $CF_3CF_2CF_2-O-CF(CF_3)-CF2-O-CF=CF_2$ (PPVE-2). Finally the reactor was pressurized with tetrafluoroethylene (TFE) to 0.2 MPa and 47 g of hexafluoropropylene (HFP) were added. The kettle was then set to 1.5 MPa using TFE and 100 ml of an aqueous initiator solution containing 140 mg of sodium disulfite followed by 100 ml of a solution containing 340 mg of ammonium peroxodisulfate was pumped into the reactor. The beginning of the polymerization is indicated by a pressure drop. During polymerization the pressure was maintained at 1.5 MPa by feeding TFE continuously. After 3.2 kg of TFE had been added, the monomer valve was closed and the pressure was released. The characteristics of the obtained polymer latexes are summarized in table 3.

1000 ml of this polymer dispersion were coagulated by adding 20 ml hydrochloric acid under agitation. The coagulated material was agglomerated with gasoline and washed repeatedly. The agglomerated polymer was dried overnight at 200° C. in a vacuum oven; test data are given in table 3.

TABLE 1

| Emulsifier | Example |
|---|---|
| $C_7F_{15}COONH_4$ | Comparative example C-1 |
| $CF_3$—O—$(CF_2)_3$—O—$CF_2$—$COONH_4$ | Comparative compound C-2 |
| $C_4F_9$—O—$CF_2$—$CF_2$—$COONH_4$ | Comparative compound C-3 |
| $CF_3$—O—$CF_2$—$CF_2$—$CF_2$—O—CHF—$CF_2$—$COONH_4$ | Compound 1 |
| $CF_3$—O—$CF_2$—$CF_2$—$CF_2$—O—CHF—$COONH_4$ | Compound 2 |
| $C_3F_7$—O—CFH—$CF_2COONH_4$ | Compound 3 |
| $CF_3$—CFH—O—$(CF_2)_5$—$COONH_4$ | Compound 4 |
| $CF_3$—CFH—O—$(CF_2)_3$—$COONH_4$ | Compound 5 |
| $C_3F_7$—O—CFH—$CF_2$—O—$CH_2$—$COONH_4$ | Compound 6 |
| $C_3F_7$—O—CFH—$COONH_4$ | Compound 7 |

Preparation of Compound 1: $CF_3O(CF_2)_3OCHFCF_2COONH_4$ a. Preparation of $CF_3O(CF_2)_3OCHFCF_2CH_2OH$ Using equipment similar to the described above, 255 g of perfluoromethoxypropyl vinyl ether and 730 g methanol were converted with Rongalit and t-butylhydroperoxide as radical source. Reaction temperature started at 47° C. and reached 64° C. at the end. Work up by distillation yielded 166 g of pure $CF_3O(CF_2)_3OCHFCF_2CH_2OH$ with a boiling point of 60-61° C./20 mbar. This corresponds to a yield of 59%.

b. Preparation of $CF_3O(CF_2)_3OCHFCF_2COONH_4$

A 2 liter glass flask equipped with a thermometer, reflux condenser, dropping funnel and stirrer was used. 159 g of $CF_3O(CF_2)_3OCHFCF_2CH_2OH$, 520 g water, and 100 g sulfuric acid were added to the flask. 190 g KMnO4 were added manually to the liquid over a period of 2 hours while stirring. The reaction temperature increased to 95° C. over time. After a post reaction time of two hours, an aqueous solution of sodium bisulfite was added until a clear solution was formed. 100 g of methanol and in total 400 g of 50% aqueous sulfuric acid were added. Flash distillation of the reaction mixture resulted in a two phase distillate. Fractionation of the lower phase (120 g) gave 85.5 g of $CF_3O(CF_2)_3OCHFCF_2COOCH_3$ (bp 34-35° C./6 mbar; yield 50%).

The ester was converted to the ammonium salt by saponification with aqueous ammonia and subsequent removal of methanol by distillation.

Preparation of Compound 2: $CF_3OCF_2CF_2CF_2OCHFCOONH_4$

A glass flask equipped with a reflux condenser, thermometer, and magnetic stirrer was used. Perfluoromethoxy propyl vinyl ether (498 g), t-butanol (149 g), water (1007 g), potassium hydroxide (280 g), and methyl trioctyl ammonium chloride (10 g) were added to the flask. The resulting two phase mixture was heated to reflux for 16 hours under vigorous stirring. The mixture was cooled to room temperature and sulfuric acid (588 g) was added. The two phase mixture was heated again under vigorous stirring. At about 70° C. gas began to evolve. Heating was continued until the gas evolution ceased. The reflux condenser was replaced by a distillation device which allowed the separation of a lower phase while returning the upper phase to the flask. Methanol (150 g) was added and the mixture was heated for distillation. Distillation was carried out at ambient pressure without any intent for rectification. The condensed vapors separated into two phases. The lower phase was collected and the upper phase was returned to the flask. Distillation was continued until no more lower phase separated from the condensate. The combined crude ester (493 g) was purified by fractionated distillation, resulting in 401 g $CF_3O(CF_2)_3OCHFCOOCH_3$ with a boiling point of 51 to 52° C./22 mbar. This corresponds to a yield of 78%, based on vinyl ether used. The ester was converted to the ammonium salt by heating with aqueous ammonia and removal of methanol by fractionated distillation.

Alternatively, the previous reaction was repeated but 36 g of an aqueous solution containing 11 g of $CF_3O(CF_2)_3OCHFCOONH_4$ was used as phase transfer catalyst instead of methyl trioctyl ammonium chloride. The mixture was slowly heated to 70° C. internal temperature. Total reaction time was 26 hours. Work up was carried out as described above. 438 g of distilled $CF_3O(CF_2)_3OCHFCOOCH_3$ received. This corresponds to a yield of 83% (calculation includes the amount of phase transfer catalyst).

The conversion to the ammonium salt was carried out as above.

Preparation of Compound 3: $C_3F_7OCHFCF_2COONH_4$ a. Preparation of $CF_3CF_2CF_2OCHFCF_2CH_2OH$ In a 2 liter glass flask equipped with a stirrer, thermometer, reflux condenser, and dropping funnel were placed 1008 g methanol, 266 g perfluoropropyl vinyl ether, and 9.2 g of Rongalit® (sodium hydroxymethyl sulfinate). The reaction mixture was heated to reflux, resulting in an internal temperature of 29° C. 7.1 g t-butyl hydroperoxide (70% in water) is added in aliquots during a 9 h time frame. The internal temperature reached 52° C. at the end. The reaction mixture showed a single liquid phase and some solids. The liquid was analyzed by GC and indicated a content of 223 g of $C_3F_7OCHFCF_2CH_2OH$ which corresponded to a yield of 75%.

Distillation of the reaction mixture resulted in 171 g of product (bp 54° C./23 mbar) corresponding to an isolated yield of 57%.

b. Preparation of $C_3F_7OCHFCF_2COONH_4$

A 2 liter glass flask equipped with a thermometer, reflux condenser, dropping funnel and stirrer was used. 674 g water, 136 g KMnO4, and 38 g NaOH are placed in the flask. 169 g $C_3F_7OCHFCF_2CH_2OH$ were added to the well stirred mixture via the dropping funnel. The temperature is held below 50° C. Residual permanganate was destroyed by addition of a small amount of methanol. The resulting slurry was filtered to remove the $MnO_2$. After washing the filter cake with water, the combined filtrate was transferred to a distillation apparatus and acidified with 65 g of sulfuric acid. 100 g methanol was added and a flash distillation was started. The distillate formed two layers. The lower layer was separated and the upper layer returned to the distillation pot. In total 182 g lower layer were collected. Fractionation of the crude ester resulted in 137 g of $C_3F_7OCHFCF_2COOCH_3$ with a boiling point of 55-56° C./52 mbar. This corresponds to a yield of 77%.

The ester was converted to the ammonium salt by saponification with aqueous ammonia and subsequent removal of methanol by distillation.

Preparation of Compound 4: $CF_3$—CFH—O—$(CF_2)_5$—$COONH_4$

A sample of diacid fluoride, $FCOCF(CF_3)$—O—$(CF_2)_5$—COF (500 g, 1.1 mol) prepared from the hexafluoropropylene oxide (HFPO) coupling of perfluoroadipoyl fluoride as described in US Pub. No. US 2004/0116742 and was added over 2 hours to a stirred slurry of sodium carbonate (500 g, 4.7 mol) in 500 g of diglyme at 85° C. to make the disalt. The reaction liberated $CO_2$ gas. Distilled water (25 g, 1.4 mol) was added at 85° C. The mixture was heated up to 168° C. with $CO_2$ off-gassing and held for 30 minutes. The reaction was cooled down and sulfuric acid (350 g, 3.6 mol) in 1100 g of water was added to make the reaction mixture acidic. Bottom phase was washed with 400 g of 50% sulfuric acid and vacuum distilled to give $CF_3$—CFH—O—$(CF_2)_5$COOH 426 g, 1.0 mol for a 95% yield having a boiling point of 132-135°

C./15 mm. This was followed by the addition of 46 g NaOH in 63 g of water. The salts were dried in a vacuum oven at 112° C./15 mm Hg to give 386 g of slight yellow sticky solids. To the salt was added sulfuric acid and the lower fluorochemical phase was vacuum distilled. The previous process was repeated two more times to yield a colorless acid. The surfactant $CF_3$—CFH—O—$(CF_2)_5COONH_4$ having a melting point of 159-165° C. was made quantitatively from the reaction of 200 g of acid reacted with excess ammonium hydroxide and dried.

Preparation of Compound 5: $CF_3$—CFH—O$(CF_2)_3$COONH$_4$

A sample of diacid fluoride, $FCOCF(CF_3)$—O—$(CF_2)_3$COF (503 g, 1.4 mol) prepared from the HFPO coupling of perfluorosuccinyl fluoride as described in US Pub. No. US 2004/0116742 and was added over 2 hours to a stirred slurry of sodium carbonate (387 g, 3.7 mol) in 650 g of diglyme at 78° C. to make the disalt. The reaction liberated $CO_2$ gas. Distilled water (35 g, 1.9 mol) was added at 85° C. The mixture was heated up to 165° C. with $CO_2$ off-gassing and held for 30 minutes. Reaction was cooled down and sulfuric acid (250 g, 2.6 mol) in 1250 g of water was added to make the reaction mixture acidic. To the bottom phase was added 60 g NaOH in 60 g of water. Dried the salt in vacuum oven at 112° C./15 mm and recovered 450 g. To the salt was added 300 g of 50% sulfuric acid and the lower fluorochemical phase was washed once with 200 g of 50% sulfuric acid. Vacuum distillation gave $CF_3$—CFH—O—$(CF_2)_3$COOH (400 g, 1.3 mol) for a 95% yield having a boiling point of 111° C./15 mm Hg. The acid was treated with caustic followed by sulfuric acid and vacuum distilled. This was repeated a second time to yield a colorless acid. The surfactant $CF_3$—CFH—O—$(CF_2)_3$ COONH$_4$ having a melting point of 64-68° C. was made quantitatively from the reaction of 208 g of acid reacted with excess ammonium hydroxide and dried.

Preparation of Compound 6: $C_3F_7$—O—$C_2HF_3$—O—$CH_2$—COONH$_4$

A mixture of 320 ml Tetrahydrofurane, 40 g Hydroxy acetic methylester and 188 g PPVE is cooled to 0° C., 27 g KOH-powder are added in small portions—during the addition of KOH, the reaction mixture heats up to 60° C. After the addition of KOH, the whole reaction mixture is agitated for 6 h at 25° C. The precipitated salt is separated by filtration, dissolved in 300 ml water and then treated with 57 g $H_2SO_4$ (conc). The resulting mixture separates in two layers; the lower phase is $C_3F_7$—O—$C_2HF_3$—O—$CH_2$—COOH, 86 g (56%). The distilled acid (bp. 125° C., 20 mbar) is neutralized with 25% aqueous ammonia solution to provide a 30% solution in water.

Preparation of Compound 7: $C_3F_7$—O—CHFCOONH$_4$

A 2 liter glass flask equipped with a mechanical stirrer, thermometer and reflux condenser (−80° C.) is used. Heating of the flask is provided by an electric heating mantle. The conversion is carried out as a one pot reaction. 275 g perfluoropropyl vinyl ether (PPVE), 280 g KOH, 602 g water, 151 g t-butanol, and 10 g methyl trioctyl ammonium chloride are placed in the flask. The three phase mixture is subjected to vigorous stirring. After initial heating a moderate exothermic reaction occurs. Mixing is continued for nine hours. During this time the internal temperature adjusts to 27-33° C. Mixing is stopped when the exothermic reaction ceases. The reaction mixture forms two layers. The low temperature reflux condenser is replaced by a standard reflux condenser. Sulfuric acid (392 g) is slowly added without external cooling. The batch is heated to reflux. Unreacted PPVE is vented. At about 80° C. internal temperature gas begins to evolve. Heating is continued until the gas evolution has ceased. At this time the internal temperature reaches 101° C. The batch is cooled to RT and the reflux condenser is replaced by a distillation device. No column is used. 110 g methanol is added to the batch and distillation is started. The condensed vapors form two layers. The lower layer is separated and the upper layer is returned to the flask. Distillation is stopped when no more lower phase is formed. In total, 234 g of lower phase are collected. Fractionation of the lower phase yields 167 g of $C_3F_7OCHFCOOCH_3$ with a boiling point of 120-122° C. at ambient pressure.

The calculated yield was 59% based on total PPVE used; 70% based on converted PPVE. The ester is converted to the ammonium salt by reaction with aqueous ammonia. Methanol is removed by fractionated distillation. The resulting aqueous solution is used as an emulsifier in the polymerization of fluorinated olefins.

Preparation of Compound C-2: $CF_3$—O—$(CF_2)_3$—O—$CF_2$—COONH$_4$

Oxidation of perfluorinated vinyl ethers with oxygen in the presence of $SbF_5$ was carried out as described in U.S. Pat. No. 4,987,254. The initially formed acid fluorides were esterified with methanol and purified by distillation. The distilled esters were converted to the corresponding ammonium salts by saponification with aqueous ammonia. A dry flask equipped with a magnetic stirrer bar, thermometer, dry ice reflux condenser, dropping funnel, and gas inlet tube was charged with 5 g of graphite. The flask was flushed with nitrogen and 332 g of $CF_3OCF_2CF_2CF_2OCF=CF_2$ were added at room temperature. 2.6 g of $SbF_5$ was added via the dropping funnel and oxygen was charged in the flask at ambient pressure. An exothermic reaction indicated the oxidation. Total reaction time was 14 hours. After the first hour, 2.6 g and after 7 hours, 3.5 g of $SbF_5$ were added. Esterification was achieved by slow addition of 50 g of methanol to the reaction mixture. The resulting ester was isolated from the batch by flash distillation after addition of 300 g water and 50 g methanol. The distillate formed two phases. The lower phase was separated and the upper phase returned to the flask. 310 g of lower phase were collected. GC analysis showed a content of 52% of $CF_3OCF_2CF_2CF_2OCF_2COOCH_3$. Purification via fractionated distillation resulted in 144 g of pure ester with a boiling point of 51° C. at 52 mbar.

$CF_3OCF_2CF_2COOCH_3$ was isolated as a by-product. Saponification of the ester with aqueous ammonia at 60 to 80° C. and removal of methanol by distillation resulted in an aqueous solution of $CF_3OCF_2CF_2CF_2OCF_2COONH_4$. All structures were confirmed by $^{19}$F-NMR spectra.

Preparation of Compound C-3: $C_4F_9$—O—$CF_2$—$CF_2$—COONH$_4$

Compound C-3 was synthesized by reaction of perfluorobutyric acid fluoride with tetrafluorooxethane and fluorination of the $CH_2$ group before conversion to the ammonium salts per WO 2005/003075.

Determination of Bio-Accumulation

The perfluorinated and partially fluorinated carboxylates were evaluated for urinary clearance using a pharmacokinetic study in rats. The goal was to measure the total amount of parent compound eliminated via urinary output and estimate the rate of elimination. The study was approved by the IACUC (Institutional Animal Care and Use Committees) and was performed in 3M Company's AAALAC (Association for Assessment and Accreditation of Laboratory Animal Care)—accredited facility.

The study utilized male Sprague Dawley rats, 6 to 8 weeks of age, and approximately 200 to 250 g body weight at study onset. The test compounds of table 2 were administered at a dose of 73 micro Moles per kg body weight in rats (N=3 animals per tested compound). All test compounds were prepared in sterile deionized water and given to rats via oral gavage. After test compounds administration, the rats were housed individually in metabolism cages for urine collection: 0 to 6 hours, 6 to 24 hours, 24 to 48 hours and 72 to 96 hours.

Animals were observed throughout the study for clinical signs of toxicity. Gross necropsy was performed at the termination of each study (96 hours post-dose) with sera and liver samples being retained from each animal.

The concentration of the parent compound or metabolites thereof were quantitatively measured via fluorine NMR on each urine sample for each animal at each time point based on internally added standards.

The bioaccumulation data obtained in accordance with the above test are reported in table 2.

TABLE 2

|  | T ½ (h) | % Recovery (96 h) | Compound-related Effects |
|---|---|---|---|
| C-1 | ~550 | 6 | Hepatomegaly |
| C-2 | 10 | 73 | — |
| C-3 | 31 | 42 | Hepatomegaly |
| Compound 1 | 12 | 84 | — |
| Compound 2 | 11 | 95 | — |
| Compound 3 | 11 | 94 | — |
| Compound 4 | 24 | 32 | Hepatomegaly |
| Compound 5 | 8 | 95 | — |
| Compound 6 | 13* | 65* | — |

*No parent compound observed in the urine. T ½ and % recovery are based on elimination of the major metabolite —$C_3F_7$—O—CHFCOO$^-$. $T_{1/2}$ is the renal half-life and is the time required for the amount of a particular substance in a biological system to be reduced to one half of its value by biological processes when the rate of removal is approximately exponential. In these examples the value of $T_{1/2}$ is calculated by exponential least squares curve fitting ($y = Ae^{Bx}$ and $T_{1/2} = 0.693/B$) where y represents the concentration of analyte in urine and x represents time in hours.

TABLE 3

|  | C-1 | C-2 | C-3 | 1 | 2 | 3 | 4* | 5 | 6 | 7* |
|---|---|---|---|---|---|---|---|---|---|---|
| Polymerization time (min) | 101 | 74 | 72 | 82 | 82 | 83 | 75 | 78 | 174 | 135 |
| Average Particle Size (nm) | 111 | 110 | 113 | 126 | 108 | 128 | 127 | 105 | 139 | 136 |
| SSG (g/cm³) | 2.166 | 2.169 | 2.165 | 2.168 | 2.167 | 2.164 | 2.151 | 2.154 | 2.210 | 2.190 |
| Solid content (w-%) | 9.9 | 10.3 | 10.2 | 10.2 | 10.3 | 10.2 | 8.1 | 10.0 | 10.0 | 10.1 |

*140 mmol

We claim:

1. A process comprising polymerizing tetrafluoroethylene in an aqueous emulsion in the presence of a non-telogenic surfactant having an anionic portion with the general formula (I):

$R_f$—O-L-$CO_2$—        (I)

wherein $R_f$ is selected from a partially fluorinated alkyl group, a perfluorinated alkyl group, a partially fluorinated alkyl group interrupted by one or more oxygen atoms, and a perfluorinated alkyl group interrupted by one or more oxygen atoms, wherein $R_f$ has from 1 to 10 carbon atoms; and L is an alkylene group having the general formula $(CX_2)_n$ wherein each X is independently selected from $R_f$, fluorine, and hydrogen and n is selected from 2 to 5, with the proviso that only one of $R_f$ or L must contain at least one selected from a —$CH_2$— unit and a —CHF— unit.

2. The process of claim 1 wherein the anionic portion of the surfactant is selected from $CF_3$—CHF—O—$(CF_2)_a$—$CO_2$—, wherein a is selected from 2 to 5; $R_f'$—O—CHF—$CF_2$—$CO_2$—, wherein $R_f'$ is selected from a perfluorinated alkyl group having from 1 to 10 carbon atoms and a perfluorinated alkyl group interrupted by one or more oxygen atoms and having from 1 to 10 carbon atoms; $R_f'$—O—$CF_2$—CHF—$CO_2$—, wherein $R_f'$ is selected from a perfluorinated alkyl group having from 1 to 10 carbon atoms and a perfluorinated alkyl group interrupted by one or more oxygen atoms and having from 1 to 10 carbon atoms; $R_f'$—O—$CF_2$CHF$CF_2$$CO_2$— wherein $R_f'$ is selected from a perfluorinated alkyl group having from 1 to 10 carbon atoms and a perfluorinated alkyl group interrupted by one or more oxygen atoms and having from 1 to 10 carbon atoms; and combinations thereof.

3. The process of claim 1 wherein tetrafluoroethylene is copolymerized with a second monomer, wherein the second monomer is a gaseous fluorinated monomer other than tetrafluoroethylene.

4. The process of claim 1 wherein tetrafluoroethylene is copolymerized with a second monomer, wherein the second monomer is selected from a perfluorovinyl ether, hexafluoropropylene, and combinations thereof.

5. The process of claim 4 wherein the perfluorovinyl ether is selected from perfluoro(methyl vinyl)ether, perfluoro(ethyl vinyl)ether, and perfluoro(propyl vinyl)ether.

6. The process of claim 1 wherein polymerizing tetrafluoroethylene yields a polytetrafluoroethylene that has an SSG density (ASTM D 4895-04) of less than 2.25 g/cm³ and is non melt-processable.

7. The process of claim 1 wherein the polymerizing is further carried out in the presence of from 2.5 mbar to 0.5 bar of an organic, saturated, hydrogen-containing fluorinated compound that has a water solubility at 25° C. of from 1×10⁻³ (mol/l*bar) to 4×10⁻³ (mol/l*bar).

8. The process of claim 7 wherein the fluorinated compound is a partially fluorinated hydrocarbon that contains chlorine or ether bridges.

9. The process of claim 7, wherein the fluorinated compound contains at least one —$CH_2$— group or at least one —$CH_3$ group.

10. The process of claim 7, wherein the fluorinated compound is selected from 1,1,1-trifluoroethane, 1,1,2-trifluoroethane, 1,1,1,2-tetrafluoroethane, and combinations thereof.

11. The process of claim 1 wherein polymerizing is carried out at a temperature of from 0 to 150° C.

12. The process of claim 1 wherein polymerizing is carried out at a pressure of tetrafluoroethylene of from 5 to 30 bar.

13. The process of claim 1 wherein polymerizing is further carried out in the presence of a fluorinated liquid and wherein the fluorinated liquid is emulsified using the surfactant as an emulsifier.

14. The process of claim 1 wherein polymerizing is carried out in the presence of the surfactant as the only emulsifier.

15. The process of claim 1 wherein the amount of the surfactant is from 0.005 to 1% by weight based on the weight of fluoropolymer solids in the aqueous dispersion.

\* \* \* \* \*

UNITED STATES PATENT AND TRADEMARK OFFICE
CERTIFICATE OF CORRECTION

PATENT NO. : 8,119,750 B2
APPLICATION NO. : 11/457236
DATED : February 21, 2012
INVENTOR(S) : Klaus Hintzer It is certified that error appears in the above-identified patent and that said Letters Patent is hereby corrected as shown below:

First Page, Left Column
Line 5, under Inventors, Delete "Aitoetting" and insert -- Altoetting --, therefor.

First Page, Right Column
Line 3-5, under OTHER PUBLICATIONS, Delete "England, "Catalytic Conversion of Fluoroalkyl Alkyl Ethers to Carbonyl Compounds", J. Org. Chem., 1984, vol. 49, pp. 4007-4008." and insert the same on line 4 as a new entry.

Third Page, Left Column
Line 35, Under FOREIGN PATENT DOCUMENTS, Delete "01/40116" and insert -- 01/46116 --, therefor.

Column 18
Line 47, In Claim 9, delete "—$CH^2$—" and insert -- —$CH_2$— --, therefor.

Signed and Sealed this
Twenty-sixth Day of June, 2012

David J. Kappos
*Director of the United States Patent and Trademark Office*